United States Patent [19]
Fleischer

[11] 4,120,373
[45] Oct. 17, 1978

[54] VEHICLE SPEED CONTROL SYSTEM WITH DUAL INTERRUPT SAFETY CIRCUIT

[75] Inventor: Helmut Fleischer, Schwieberdingen, Germany

[73] Assignee: Robert Bosch GmbH, Stuttgart, Germany

[21] Appl. No.: 770,585

[22] Filed: Feb. 22, 1977

[30] Foreign Application Priority Data

Mar. 10, 1976 [DE] Fed. Rep. of Germany ....... 2609843

[51] Int. Cl.² ............................................ B60K 31/00
[52] U.S. Cl. ................................ 180/105 E; 123/102
[58] Field of Search ...................... 180/105 E, 105 R; 123/102; 317/5

[56] References Cited

U.S. PATENT DOCUMENTS

| | | | |
|---|---|---|---|
| 3,612,017 | 10/1971 | Ishizaki | 123/102 |
| 3,715,006 | 2/1973 | Walsh | 180/105 E |

*Primary Examiner*—Joseph F. Peters, Jr.
*Assistant Examiner*—Terrance L. Siemens
*Attorney, Agent, or Firm*—Flynn & Frishauf

[57] ABSTRACT

A motor drives a fuel supply control element, typically the throttle of an automotive-type gasoline engine through a solenoid controlled coupling. Upon brake, clutch, manual switch, or other interrupting operation, the solenoid is de-energized so that a spring can permit interruption of the coupling and a throttle return spring can return the throttle to idle position. To prevent dangerous conditions from arising, and run-away of the engine in case of malfunction of the coupling, an electronic circuit is provided to introduce a signal to the speed control system which tends to move the throttle positioning motor to change the position of the throttle to idle speed condition if a disabling signal is sensed. Preferably, additionally, a first timing circuit interrupts energization of the positioning motor servo loop after a predetermined period of time; a second timing circuit may be provided which has a time constant which is long with respect to the return time of the throttle under its spring connection and controlling a malfunction memory which provides a visual indication of malfunction in the system.

12 Claims, 2 Drawing Figures

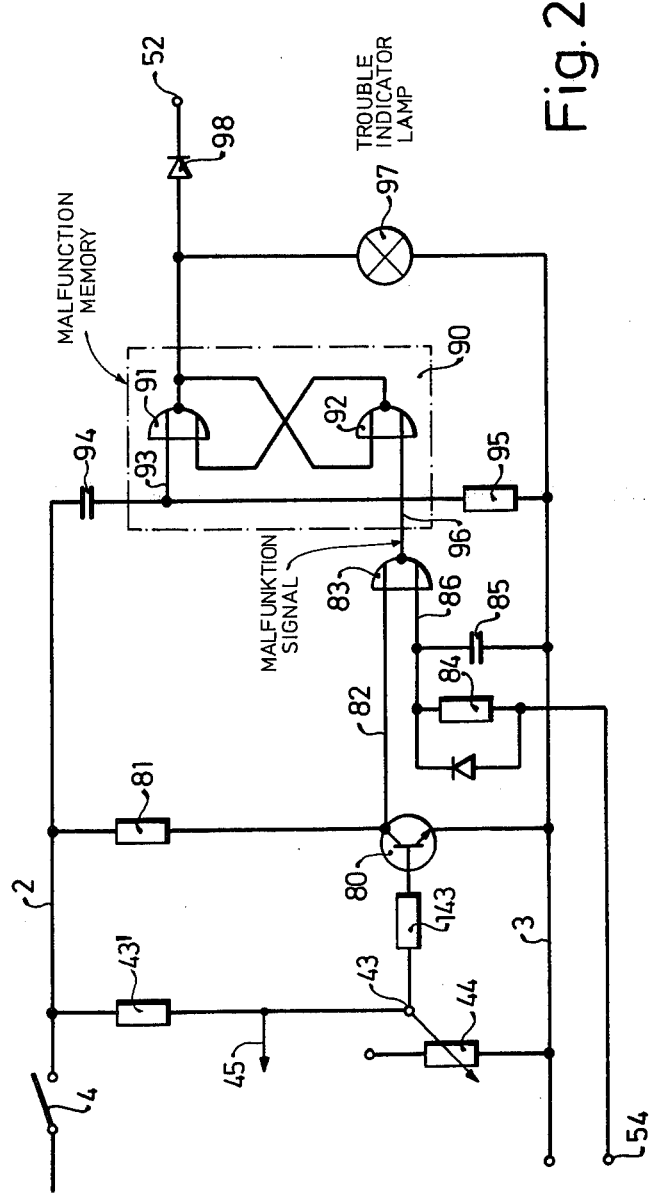

VEHICLE SPEED CONTROL SYSTEM WITH DUAL INTERRUPT SAFETY CIRCUIT

CROSS REFERENCE TO RELATED APPLICATIONS

U.S. Ser. No. 770,595, filed Feb. 22, 1977, FLEISCHER et al; U.S. Ser. No. 770,594, filed Feb. 22, 1977, FLEISCHER assigned to the assignee of the present invention.

The present invention relates to a speed control system for vehicles driven by internal combustion engines, and more particularly to apparatus to control the fuel supply to the internal combustion engine in such a manner that the vehicle speed will remain at an essentially constant value regardless of the inclination of the surface over which the vehicle travels.

Various types of vehicle speed control systems have been proposed; they operate on the principle of servo systems. For safety, it is necessary that the vehicle speed control be rapidly disconnected if the operator wishes to change operating conditions of the vehicle, for example by operating the brake, changing gears, or the like. One such system uses an automatically controllable positioning element, typically an electric motor which positions the fuel supply element to provide the appropriate amount of fuel to the engine, for example an electric motor which sets the position of the throttles of an Otto-type, gasoline-powered internal combustion (IC) engine. A disengageable coupling is interposed between the electric motor and the fuel supply element, for example the throttle. The coupling can be disconnected upon generation of a disconnect signal.

A previously proposed system uses an electromagnet to disconnect or disengage the coupling. The electromagnet is energized when the speed servo system is operational. Energizing the electric magnet causes the coupling to engage and to effect a fixed transmission between the motor and the fuel supply setting elements, typically the throttle of the IC engine. Upon operation of the brake, clutch of the vehicle, or a disengagement switch, the operating circuit of the electromagnet is interrupted. The throttle is returned to idle position by a spring. It may occur that the magnetic coupling does not immediately disengage due to a mechanical or electrical defect, even though the brake has been operated, or the transmission clutch has been disengaged, thus generating a coupling-disengagement signal. The controller continues to supply control signals, however, tending to maintain the previously set speed of the vehicle. This may lead to dangerous conditions since the vehicle drive will counteract braking of the vehicle, or changing of gears is impeded due to excessive engine speed. If the engine is operating without load and the vehicle decelerates, the speed control system, if continued to be engaged, will tend to accelerate the engine which may lead to excessively high speed of the engine and damage thereto. Failure to operate properly may also be due to sticking of relay contacts, or other defects.

It is an object of the present invention to improve the operating safety of a vehicle speed control system in which a disconnect coupling is interposed between a positioning motor and the fuel supply control element, typically the throttle of a gasoline-type vehicle engine.

Subject matter of the present invention: Briefly, a disconnect signal, generated for example upon operation of the brake, the clutch of the vehicle, or otherwise, additionally is applied to the speed portion of the control system to set the speed portion to command a fuel supply which causes the engine to operate at idle speed. In essence, the disconnect signal provides a command value which commands the speed servo system to idle condition. The change in the command value can be introduced into the control system, or control loop at any desired position therein; it is only necessary to ensure that introduction of this additional signal will effect the proper change in the position of the fuel supply element, typically the throttle, in the direction to move the throttle to operation of the engine at idle speed.

The present invention is based on the concept that the fuel supply element, and hence the controller itself, is returned to idle speed condition. The above referred-to possibly dangerous operating conditions of the vehicle thus are avoided, even if the disconnect coupling between the positioning motor and the fuel control element should fail.

The system in accordance with the present invention will then operate under two conditions, namely under emergency conditions and under ordinary operating conditions. Under emergency conditions, the electrical and mechanical elements are so matched that, in due course, the positioning motor will be de-energized as soon as the idle position of the fuel control element, typically the throttle, and the actual idle speed of the engine are in agreement. Under ordinary operating conditions, the coupling is disconnected. This does no longer, however, provide for proper association of commanded speed and actual speed of the engine, and might therefore lead to unnecessary interruption in the smooth operation of the engine and would lead to unncessary uninterrupted motor operation.

In accordance with a preferred feature of the invention, the disconnect signal acts on the final stage, or at least at the portion controlling return of the throttle to idle position with some time delay; the delay time is so calculated that return of the throttle to idle position is possible from all positions of the fuel control elements, that is, also from full, wide-open throttle position.

DRAWINGS — ILLUSTRATING AN EXAMPLE

FIG. 2 is a diagram of an auxiliary circuit which increases the operating reliability and safety.

Figure 1:
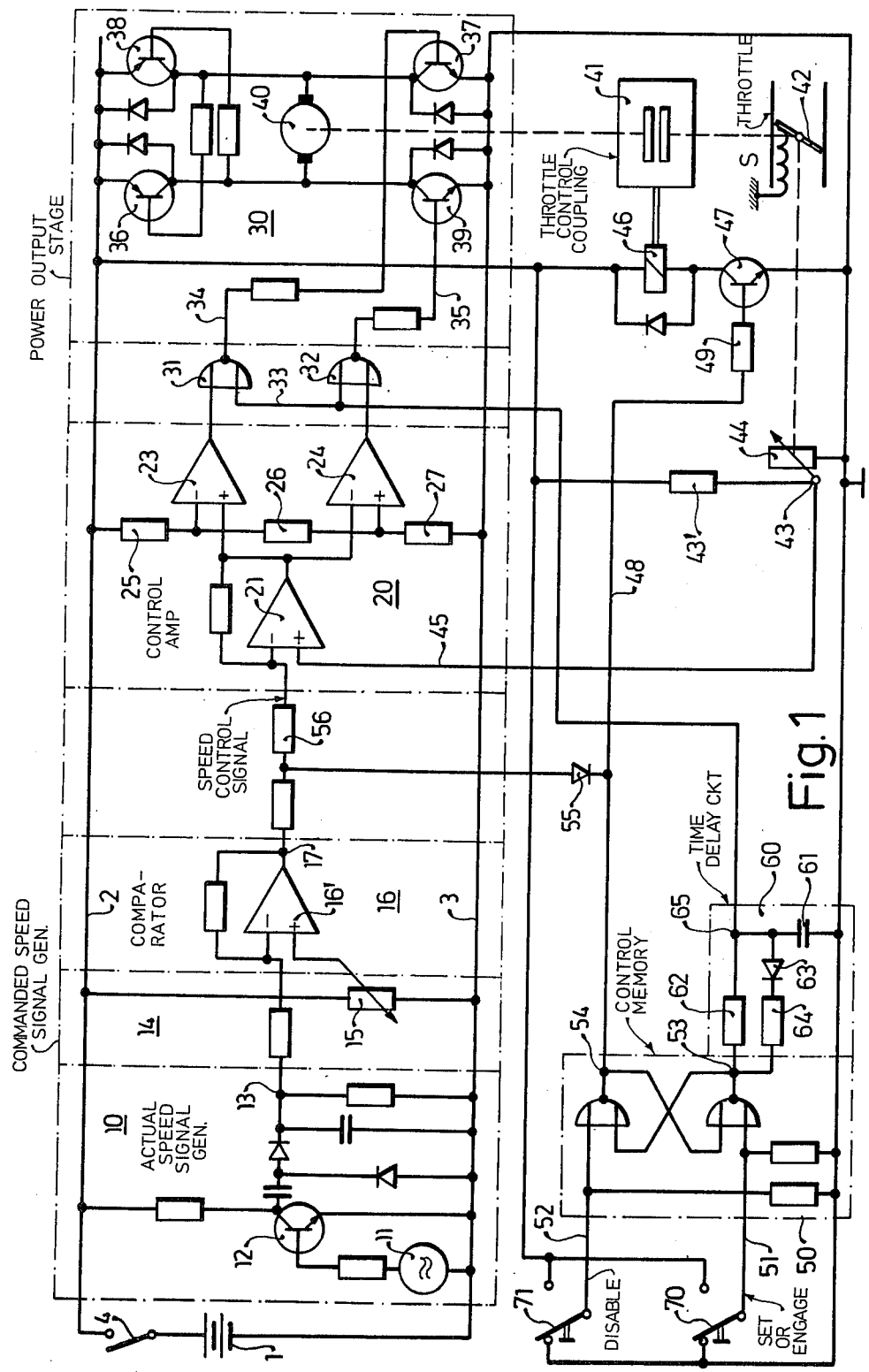
FIG. 1 is a schematic circuit diagram of a servo speed control system.

A voltage source 1, typically the battery of the vehicle, is connected by switch 4 to positive and negative buses 2, 3; a voltage regulator may be interposed so that the voltage between buses 2, 3 is controlled. Bus 3 may be the chassis or ground terminal of the vehicle. The actual speed signal generator 10 includes a tachometer generator 11, providing an output a-c voltage to the base of a switching transistor 12 which is periodically changed from fully conductive or satured, to blocked state. The square wave arising at the collector of transistor 12 is connected through a wellknown integrating or pump circuit to an output 13 to provide a d-c voltage, the level of which is representative of the speed of the tachometer generator. This output voltage is an actual speed signal, representative of actual speed of the vehicle.

The command signal generator 14 can be a potentiometer 15, connected between buses 2 and 3, or any other command speed signal source, for example as illustrated in the cross-referenced co-pending application Ser. No. 770,595, filed Feb. 22, 1977, Fleischer et al.

The output voltage from the command speed signal generator is compared in comparator 16 with the actual speed signal from terminal 13. Comparator 16 includes an operational amplifier 16'. A speed error signal is derived at terminal 17. The error signal 17 is the control signal for the subsequent control amplifier 20 and the power stage 30 connected thereto. Control amplifier 20 includes three operational amplifiers; operational amplifier 21 is connected to the output from comparator 16 and provides its output signal to two operational amplifiers 23, 24, likewise connected as comparators. The operational amplifiers 23, 24 are so connected that either, or neither of them can provide an output signal, but not both together. The operational amplifiers have one input clamped to a fixed voltage, as determined by a voltage divider formed by resistors 25, 26, 27 for comparison with the output voltage from operational amplifier 21. The output is derived from the respective operational amplifier 23, 24 when the output voltage of the control operational amplifier 21 exceeds a first threshold value, or passes below a second threshold value. The threshold values themselves are determined by the voltage division ratio of resistors 25, 26, 27. The control amplifier 20 could, therefore, be considered a three-position controller, with hysteresis. The power output stage 30 is controlled from the operational amplifiers 23, 24 through two NOR-gates 31, 32. If the control inputs 33 of the two NOR-gates 31, 32 have a positive voltage applied thereto, then the output signal of these NOR-gates is independent of the output signal of the operational amplifiers 23, 24 respectively, and is always zero or null, since the gates are blocked. If the control inputs 33 are grounded, or connected to the chassis bus 32, however, then the output signals of the operational amplifiers 23, 24 are connected through the respective gate, or gates to the control lines 34, 35 of the power output stage 30.

The power output stage 30 is a bridge circuit having four transistors 36, 37, 38, 39, two of which, respectively, can be commanded to be conductive. The direction of rotation of the electric positioning motor 40 then will depend on which one of the control lines 34, 35, respectively, have an output signal appear thereat.

A coupling 41 is associated with motor 40 and mechanically connected between the drive shaft of the motor and the throttle 42 of a gasoline-type IC engine. The throttle can be set to idle position by means of a spring S mechanically connected thereto. The mechanical connection between motor 40, coupling 41 and throttle 42 is schematically indicated by a broken line. The slider 43 of a variable resistor 44 is mechanically connected to throttle 42. The slider connection 43, fed with voltage through resistor 43' from positive bus 2, provides a voltage which is proportional to the position of the throttle 42, and connected over line 45 to the direct input of the operational amplifier 21 of control amplifier 20. The connection may be in accordance with cross-referenced application Ser. No. 770,594, filed Feb. 22, 1977, by the inventor hereof.

Besides the main control circuit, a subsidiary or cascaded servo loop is provided which feeds back the actual position of throttle 42 to the control amplifier so that the position of throttle 42 is determined within a control loop, the command signal of which is derived from output 17 of comparator 16.

Operation: The actual speed and commanded speed are compared in comparator 16 to provide an error signal which is representative of the desired deflection of the throttle 42. This error signal is the command signal for the subsidiary control loop for the throttle 42. The control amplifier 20, and specifically the operational amplifier 21, compares this commanded signal with the actual signal representative of actual position of throttle 42, the actual position signal being derived at terminal 43 forming the junction between resistor 43' and the slider of resistor 44, the actual position signal being fed back through line 45 for comparison in operational amplifier 21.

Coupling 41 is connected upon energization of a solenoid 46. Solenoid 46 is connected in the main current carrying path, that is, the emitter-collector path of a switching transistor 47. Transistor 47 is controlled from a control memory 50, through a line 48 and coupling resistor 49.

Control memory 50 has a set input 51, disable input 52 and two complementary outputs 53, 54. It may be constructed, as shown in the drawing, by two NOR-gates in the form of an RS flip-flop (FF). The output 54 is connected to the control line 48 for the transistor 47 controlling operation of the solenoid 46. Solenoid 46 is bypassed by a free-wheeling diode, as customary. The output 54 of the RS flip-flop is additionally connected to the cathode of a diode 55, the anode of which is connected through resistor 56 with the inverting input of operational amplifier 21, that is, it is connected into the circuit connecting the comparator 16 to control amplifier 20. The other output 53 of the control memory 50 is connected to a time delay circuit 60 having a capacitor 61 which is charged through a resistor 62 and which can be discharged through a diode 63 and resistor 64. The resistor 62, essentially, determines the delay time of disconnection of the power output stage; resistor 64 should be small and functions only as a current limiting resistor for the diode 63. It should be as small as possible, consistent with the current carrying capability of diode 63, in order to provide a rapid resumption of operability of the circuit. The output 65 of the delay circuit 60 is connected to the control inputs 33 of the two NOR-gates 31, 32, interposed between the outputs from the control amplifier 20 and the input lines 34, 35 of the power output stage 30.

Operation of the control system: The speed servo system is enabled by operating the set or "engage" switch 70. Upon application of a positive supply voltage to the input 51 of control memory 50, the output voltage at terminal 53 jumps to approximately zero or chassis potential, permitting discharge of capacitor 61 through diode 63 and resistor 64. As soon as the capacitor has discharged, that is, after a very short time, the NOR-gates 31, 32 are opened. Control signals as derived from the output 17 of the comparator and controlling the control amplifier 20 can thus be applied to the power output stage. When the engage or set contact 70 is operated, the complementary output 54 of the control memory 50 will jump to approximately positive supply voltage, thus blocking the switching diode 55. The output signal from comparator 16 can thus be applied to the control amplifier 20. At the same time, the control line 48 is enabled, and resistor 49 applies positive voltage to the switching transistor 47, thus energizing the solenoid 46 and closing coupling 41. The speed control system can now operate and the speed of the vehicle will be maintained at the predetermined value.

The speed control system can be disabled by operation of the disabling switch 71. Switch 71 can be manually operated but it can equally be operated by the brake or the clutch of the vehicle, either directly or through other circuit components, coupled to line 52 leading to the control memory 50, for example, through an OR-gate. If a positive signal is applied to line 52, for example upon operation of switch 71 or by other mechanical or electronic switches, the disable signal applied thereby causes the voltage at terminal 54 to collapse and to approach approximately zero or chassis potential. This causes diode 55 to become conductive while the transistor 47 will be blocked. At the same time, the voltage at output 53 of the control memory 50 will become highly positive, so that capacitor 61 is slowly charged through resistor 62. After a predetermined delay time as determined by the relative values of resistor 62 and capacitor 61, essentially of resistor 62, the NOR-gates 31, 32 will block.

A disable signal applied to line 52 thus causes interruption of the operating current to the solenoid 46 which results in immediate opening of coupling 41, for example under spring pressure. It may occur, however, that the coupling 41, or the solenoid or any other component in the circuit is defective. Even if this should occur, throttle 42 is returned to close or engine-idle position since the disconnect signal rendered diode 55 conductive. The inverting input of operational amplifier 21 of the control amplifier 20 will thereby have a voltage applied thereto which is higher than ground or chassis potential only by the inherent voltage drop of the diode. This very low voltage then will form the command voltage for the control amplifier and should correspond to that voltage which is fed back from terminal 43 of the resistor 44 coupled to throttle 42 when the throttle is in idle position. When a disable signal is applied to line 52 of the control memory, therefore, the commanded speed signal applied to the control amplifier 20 is therefore additionally set to idle speed position. The positioning loop therefore will continue to operate until the motor 40 has returned throttle 42 to idle position if the throttle control coupling 41 has not disengaged. Since both the NOR-gates 31, 32 will block at the termination of the time delay circuit, the power output stage 30 will be disconnected shortly thereafter, that is, shortly after the throttle has been returned to idle position. The time delay of circuit 60, therefore, should be set to correspond to a return of the throttle to idle position even if it previously had been in fully open position.

In accordance with a feature of the invention, an indicator can be provided to indicate to the driver that there is a defect in the coupling 41 between the motor 40 and the throttle 42 in order to provide a warning not to use the speed control system. FIG. 2 illustrates the additional portion of the circuit which provides such an indication.

The voltage occurring at the junction 43, that is, on the slider of the resistor 44 (shown again in FIG. 2) is additionally applied through a coupling resistor 143 to an amplifier including a transistor 80, a collector resistor 81, and having an output at line 82. The amplifier transistor 80 also operates as an inverter; the output line 82 is coupled to one input of a NOR-gate 83. The output terminal 54 of the control memory 50 is connected to a timing circuit including a resistor 84 and a capacitor 85. The output of the R/C timing circuit 84, 85 is connected to the second input of the NOR-gate 83 through its output line 86.

A malfunction memory 90 is provided, constructed as an RS-FF, and including two NOR-gates 91, 92. The reset input 93 of the RS-FF 90 is connected through a capacitor 94 to the positive bus 2. The SET input 96 of the RS-FF 90 is connected to the output of the NOR-gate 83. Malfunction is indicated by a trouble indicator lamp 97. A diode 98 is connected additionally from the output of the malfunction memory 90 to the disable input 52 of the control memory 50.

Operation of additional accessory circuit, FIG. 2: Upon closing switch 4, applying positive voltage to bus 2, a voltage kick will be transferred through capacitor 94 to SET the malfunction memory 90 in its quiescent state. This extinguishes the trouble indicator lamp 97. The capacitor 94 will charge through resistor 95 and the voltage at the RESET input 93 will drop from approximately operating voltage to approximately chassis potential.

When the speed control system is engaged, that is, switch 70 (FIG. 1) operated, the output 54 of the control memory 50 will have approximately operating voltage. Capacitor 85 (FIG. 2) is charged to this operating voltage. The voltage at line 82 will be small since transistor 80 will switch to fully conductive state as soon as the throttle 42 is changed from its idle position.

If the speed control system is disconnected or disabled, the voltage at terminal 54 of control memory 50 (FIG. 1) will change to approximately chassis potential, and capacitor 85 can discharge through resistor 84. The time constant of this discharge circuit is so selected that the threshold value of the NOR-gate 83 will be passed in decreasing direction after approximately 200 milliseconds. As the speed control system is disabled, the throttle 42 is returned to its idle state by the spring S, if the system functions normally (or by the motor 40 if the coupling 41 continues engaged, as described in connection with FIG. 1). This causes blocking of transistor 80, and the voltage at line 82 will change to approximately positive, operating potential. If the operating potential rises during the unstable phase of the R/C timing circuit 84, 85, then there still will be no change of the voltage at the output of the NOR-gate 83 since at least one of the two inputs will have operating potential applied. This is the condition if the throttle is returned, normally, by the spring S. If, however, due to a defect in the coupling 41, the motor 40 has to return the throttle 42 to idle position, return of the throttle will be much slower. As a consequence, the voltage at line 82 will not yet have changed even though the unstable, or timing period of the R/C timing circuit 84, 85, has ended. Both inputs of the NOR-gate 83 then will have ground or chassis potential applied, so that the voltage at the output thereof jumps to operating potential and the malfunction memory 90 is RESET into malfunction indication state. Trouble indicator lamp 97 will light. The output of the malfunction memory 97 is coupled with the disable input 52 of the control memory 50, and thus the control memory 50 is disabled and the speed control system can no longer be used.

As soon as the throttle 42 has reached its base position, and the voltage at line 82 has risen to operating potential, NOR-gate 83 will change over; this signal cannot change the condition of the malfunction memory, however, since renewed setting of the speed control system, for example by operating the switch 70, will not change the condition of the malfunction memory, although the output voltage at terminal 54 of the control memory will rise to a high level.

The malfunction memory 90 can be reset only by interruption of the supply voltage, that is, by opening of the switch 4, typically the ignition switch. This permits discharge of capacitor 94. Upon re-connection of the operating voltage, the terminal 93 of the malfunction memory will have operating voltage applied, thus changing over the state of the malfunction memory.

The embodiment of FIG. 2 thus provides a malfunction signal which is dependent on the return time of the throttle 42, that is, whether the throttle is quickly returned by the spring S, or slowly by the motor 40. This malfunction signal changes the state of the malfunction memory 90, by energization of terminal 96. This embodiment is much simpler and more reliable than a mechanical evaluation of operability of the coupling 41, for example by mechanically evaluating the distance of two halves of a mechanical claw, or other type of coupling. Return of the throttle 42 to idle position is thus double ensured. When the coupling functions properly, spring S returns the throttle to idle position; if the coupling is defective, the system is so arranged that the motor 40 itself returns the throttle to idle position. Critical situations which could, therefore, arise upon operation of a brake of the vehicle, upon clutch operation or other control to effect gear changing are thereby reliably prevented.

The system provides for a simple overriding control of the speed signal which is applied to the control amplifier 20. This speed control signal, under normal conditions, is derived from the output terminal 17 of comparator 16. The speed control signal can be easily changed over, however, by connecting the switching diode 55, as shown in FIG. 1, the switching diode 55 having the disable signal applied thereto from the control memory 50. The disabling signal could also be introduced at other portions in the circuit; as shown in FIG. 1, however, application of the disabling signal to the control amplifier of the positioning servo loop permits operation at low power levels, and provides for reliable return of the throttle 42 to idle position by the motor 40.

The time delay circuit 60, by being connected to the NOR-gates 31, 32 through their input lines 33 is an inexpensive construction which is cheaper and more reliable than connection of the output 33 of the time delay circuit to the power supply, for example, thus interrupting power to the motor 40. The gates 31, 32 operate at a lower power level.

The time delay circuit 60 is so constructed that the time constant for charging is longer than the time constant for discharging. This permits sufficient delay for disconnection, but rapid availability of the circuit for re-connection, if needed.

Even if only the circuit of FIG. 1 is used, the driver will notice malfunction of the coupling 41 if his foot lightly touches the accelerator or gas pedal. Upon disconnection of the automatic speed control system, he would notice that the gas pedal would not immediately snap to idle position but, rather, return only slowly to the idle position. It would be more desirable, however, to provide an indicator lamp, and the additional circuit portion illustrated in FIG. 2 furnishes such an indication. While it would be possible to couple the two portions of the coupling 41 with a switch which is connected to an indicator signal, the circuit of FIG. 2, effectively, electronically senses the return time of the throttle 42 and derives a malfunction signal from the return time. The spring S, normally, would return the throttle 42 within a time period less than 200 milliseconds from any position to idle position, if coupling 41 is functioning properly and disconnects. If the coupling 41 is defective, however, the time for return of the throttle to idle position would be in the order of about 2 seconds — the exact time depending on the previous position of the throttle. Since speed control systems are operated only when the vehicle is traveling at a substantial speed — many such systems are not recommended for operation at less than 50 km/h — the throttle would have, under ordinary conditions, a substantial opening angle. The substantial differences in return time when operated by the motor 40, rather than the spring S, is evaluated and the malfunction signal derived as a consequence. The R/C timing circuit 84, 85 (FIG. 2) easily can sense the difference in time between spring return of the throttle or motor return, and then, by logic connection through a logic circuit formed by gate 83, control malfunction memory 90 (FIG. 2). Preferably, the malfunction signal is stored in the memory 90 and continuously applied to the trouble indicator lamp 97 and, desirably, additionally applied through diode 98 to the disabling input 52 of the control memory to initially additionally provide a signal to disable the control memory and to hold the trouble indicator lamp in indicating position to provide a continuous warning of defective coupling operation.

Various changes and modifications may be made within the scope of the inventive concept.

I claim:

1. Vehicle speed control system to control a fuel supply element (42) of an internal combustion (IC) engine driving the motor vehicle comprising means (10) providing an actual speed signal;
means (14) providing a command speed signal;
comparator means (16) connected to said actual and said command speed signal providing means and providing a speed error signal;
an automatically controllable positioning element (40) controlling the position of the fuel supply element (42) of the engine;
a control stage (20) and a power stage (30) connected to and controlled by the comparator means (16) and providing output energization for automatic control of the positioning element (40);
a selectively engageable coupling (41) interposed between the positioning element (40) and the fuel supply element (42);
electromagnetic control means (46) controlling, in response to an "engage" and a "disable" signal, respectively, selective engagement and disengagement of the coupling (41) to thereby engage or disable control of the fuel supply element position as a function of speed error signals, and
means (50, 55, 56) applying the "disable" signal as an overriding speed control signal to the automatically controllable positioning element to command operation of the positioning element (40) in a direction to move the fuel supply element to idle speed fuel supply position.

2. System according to claim 1, including a time delay circuit (60) controlled by the "disable" signal and disconnecting the positioning element (40), with time delay, if a "disable" signal has been sensed.

3. System according to claim 1, wherein the means applying the "disable" signal includes a switching diode (55) connecting the "disable" signal to the speed error signal output from the comparator (16).

4. System according to claim 1, further comprising at least one controlled gate (31, 32) connected between the control stage (20) and the power stage (30);

a timing circuit (60) controlled by the "disable" signal and having its output connected to the at least one controlled gate (31, 32) in a direction to inhibit transfer of signals from the control stage (20) to the power output stage (30) when a predetermined time period, as determined by the time delay circuit (60), after initiation of the "disable" signal has elapsed.

5. System according to claim 1, wherein the means applying the "disable" signal comprises a control memory (50) having "engage" and "disable" inputs (51, 52);

two complementary outputs (53, 54), one of the outputs being connected to the electromagnetic control means for said coupling (41) and being additionally connected (55, 56) to the control stage (20) to provide an overriding speed control signal tending to move the positioning element (40) to in turn control the position of the fuel supply element to minimum or idle speed fuel supply position;

the complementary output (53) being connected, with time delay (60) to the power stage (30) to prevent transfer of control signals from the control stage (20) to the power stage (30) upon elapse of the delay time.

6. System according to claim 5, further comprising a delay circuit (60) interposed between the complementary output (53) and the power stage (30), the delay circuit (60) comprising an R/C circuit (61, 62, 63, 64) having a longer first delay time and a shorter reset delay time to provide a delay time constant which is longer than the time constant of the circuit after the circuit has been first enabled and delayed transmission of the disabling signal, so that the resumption or engaging signal will be transmitted rapidly.

7. System according to claim 1, further comprising means (S) biasing the fuel supply element (42) to idle fuel supply position;

and further comprising (FIG. 2) a second timing circuit (84, 85) having a timing constant which is long with respect to the resetting time of the fuel supply element (42) under influence of its biasing element (S).

8. System according to claim 7, further comprising means (80, 83) comparing the reset time of the fuel supply element (42) with the time period of the second timing circuit (84, 85) and deriving a function signal if the actual reset time of the fuel supply element exceeds the timing period of the second timing circuit.

9. System according to claim 8, further comprising a malfunction memory (90) controlled by the malfunction signal, connected to a source of power supply, and storing the malfunction signal continuously, even after termination of the malfunction signal, until the power supply to said memory has been interrupted.

10. System according to claim 1, further comprising signal generator means (43, 43') coupled to the fuel supply element (42) and deriving a position signal representative of the position of the fuel supply element (42);

an inverting amplifier (FIG. 2: 80, 81) controlled by the position signal;

a NOR-gate (83) having the output signal of the inverting amplifier applied to one input thereof;

a timing circuit (84, 85) connected to the "disable" signal and providing a timing period which is long with respect to return of the fuel supply element to idle fuel supply position under normal conditions, the output of said second timing circuit (84, 85) being connected to another input of the NOR-gate (83);

and a malfunction memory (90) having its storage control input (96) connected to the output of the NOR-gate, to store a malfunction condition therein, and provide continuous malfunction output signals if the return time of the fuel supply element (42) to idle fuel supply position exceeds said time period of said second timing circuit (84, 85).

11. System according to claim 10, further comprising a source of power (1, 2, 3; 4) to supply the malfunction memory (90) and a capacitor (94) connecting the power supply (1, 2, 3, 4) to the malfunction memory to enable the malfunction memory upon connection of the power supply, and provide for continued storage of malfunction conditions therein until the memory is disconnected from the power supply, and the capacitor is again re-connected to the source of power supply.

12. System according to claim 10, further comprising a coupling means (98) connecting the output of the malfunction memory to the disable input of the means applying the disable signal (50, 55, 56) to furnish a continuous disable signal to said disable signal applying means (50, 55, 56).

* * * * *